US012768328B1

(12) United States Patent
Jalaliyazdi et al.

(10) Patent No.: US 12,768,328 B1
(45) Date of Patent: Oct. 20, 2026

(54) PREDICTIVE ENGINE AUTO-STOP CONTROL

(71) Applicant: GM GLOBAL TECHNOLOGY OPERATIONS LLC, Detroit, MI (US)

(72) Inventors: Milad Jalaliyazdi, Richmond Hill (CA); Reza Zarringhalam, Whitby (CA); Kevin A O'Dea, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/274,544

(22) Filed: Jul. 19, 2025

(51) Int. Cl.
*F02N 11/08* (2006.01)
*B60W 30/18* (2012.01)

(52) U.S. Cl.
CPC ... *F02N 11/0837* (2013.01); *B60W 30/18018* (2013.01); *F02N 11/084* (2013.01); *F02N 2200/08* (2013.01); *F02N 2200/102* (2013.01); *F02N 2200/12* (2013.01)

(58) Field of Classification Search
CPC ............... F02N 11/0837; F02N 11/084; F02N 2200/08; F02N 2200/102; F02N 2200/12; B60W 30/18018
See application file for complete search history.

(56) References Cited

U.S. PATENT DOCUMENTS

2013/0332054 A1* 12/2013 Kristinsson ......... F02N 11/0837 701/113
2014/0343830 A1* 11/2014 Elwart ................ F02N 11/0837 701/112
2017/0043767 A1* 2/2017 Khafagy ............. B60W 10/184
2018/0237016 A1* 8/2018 Khafagy .................. B61H 1/00
2018/0347530 A1* 12/2018 Le .......................... F02N 11/084
2022/0176972 A1* 6/2022 Miller .............. G08G 1/096725

FOREIGN PATENT DOCUMENTS

DE 102015203236 A1 8/2015
DE 102015104123 A1 9/2015
DE 102019134405 A1 6/2020
DE 102024112424 A1 5/2025

* cited by examiner

*Primary Examiner* — George C Jin
(74) *Attorney, Agent, or Firm* — Ingrassia Fisher & Lorenz, LLP | IFL

(57) ABSTRACT

A method for controlling auto-stop includes monitoring motion parameters of vehicles in a travel path, traffic control device information, or planned maneuver information; calculating a score based on a weighted combination of the monitored information, wherein the score represents a likelihood of imminent movement; comparing the score to a threshold to define a comparison; and controlling an auto-stop system of the host vehicle based on the comparison, wherein controlling includes maintaining an engine in an off state when an adaptive cruise control system is active and the score is below threshold, despite detected movement of a lead vehicle; initiating an engine restart request while the engine is in an auto-stop state and prior to release of a brake pedal when the score exceeds threshold, indicating an anticipated movement; or preventing engine shut-off when the host vehicle is approaching a stop and the exceeds threshold, indicating a predicted short stop duration.

20 Claims, 8 Drawing Sheets

PREDICTIVE ENGINE AUTO-STOP CONTROL

INTRODUCTION

The technical field generally relates to vehicles and, more specifically, to methods and systems for controlling adaptive cruise control operation in vehicles equipped with engine auto-stop functionality to improve fuel efficiency and reduce emissions.

Certain vehicles today have engine auto-stop functionality that automatically shuts off the engine when the vehicle comes to a stop to reduce fuel consumption and emissions. Many vehicles also include adaptive cruise control (ACC) systems that maintain a set speed while following a lead vehicle at a predetermined distance. However, in certain situations, the interaction between these systems may not provide optimal fuel efficiency benefits.

Accordingly, it is desirable to provide improved methods and systems for integrating adaptive cruise control and engine auto-stop functionality in vehicles. Furthermore, other desirable features and characteristics of the present disclosure will become apparent from the subsequent detailed description and the appended claims, taken in conjunction with the accompanying drawings and the foregoing technical field and background.

SUMMARY

In one embodiment, a method for controlling auto-stop operation in a vehicle is provided. The method includes monitoring, via one or more sensors, motion parameters of one or more vehicles in a travel path of a host vehicle, traffic control device information, or planned maneuver information; calculating, by a processor, a host movement score based on a weighted combination of monitored information from the one or more sensors, wherein the host movement score represents a likelihood of imminent movement of the host vehicle within a predetermined time period; comparing, by the processor, the host movement score to a predetermined threshold value to define a comparison; and controlling, by the processor, an auto-stop system of the host vehicle based on the comparison, wherein controlling includes maintaining an internal combustion engine in an off state when an adaptive cruise control system is active and the host movement score is below the predetermined threshold value, despite detected movement of a lead vehicle ahead of the host vehicle; initiating an engine restart request while the internal combustion engine is in an auto-stop state and prior to release of a brake pedal when the host movement score exceeds the predetermined threshold value, indicating an anticipated movement; or preventing engine shut-off when the host vehicle is approaching a stop and the host movement score exceeds the predetermined threshold value, indicating a predicted stop duration below a minimum time threshold.

In certain embodiments of the method, calculating the host movement score includes calculating a weighted sum according to the formula: Host movement score$=w_{cip}\times p_{cip}+w_{cip2}\times p_{cip2}+w_{tcd}\times p_{tcd}+w_{mnvr}\times p_{mnvr}$, where $w_{cip}$, $w_{cip2}$, $w_{tcd}$, and $w_{mnvr}$ are weighting factors, and $p_{cip}$, $p_{cip2}$, $p_{tcd}$, and $p_{mnvr}$ are probability values for a closest-in-path vehicle, a second closest-in-path vehicle, traffic control devices, and planned maneuvers, respectively.

In certain embodiments of the method, calculating $p_{cip}$ includes determining $p_{cip}=a1\times vCIP+b1\times\int vCIP\,dt$, where vCIP is a velocity of the closest-in-path vehicle, a1 and b1 are calibration parameters, and the integral is calculated from a time when the host vehicle first stopped.

In certain embodiments of the method, calculating $p_{tcd}$ includes: assigning $p_{tcd}=1$ when a traffic light is green and no closest-in-path vehicle is present; assigning $p_{tcd}=c$ when the traffic light is green and a closest-in-path vehicle is present, where c is a value between 0 and 1; assigning $p_{tcd}=1$ when a distance to a stop sign is less than a threshold distance d0; and assigning $p_{tcd}=0$ otherwise.

In certain embodiments of the method, the planned maneuver information includes turn signal status of the host vehicle; steering angle of the host vehicle; proximity to a turn in a planned route; proximity to a lane ending; or proximity to pedestrian crossings.

In certain embodiments of the method, maintaining the internal combustion engine in an off state includes detecting that adaptive cruise control is engaged; detecting that the internal combustion engine is in the auto-stop state; detecting movement of a closest-in-path vehicle; and maintaining the host vehicle in a stopped position when the host movement score remains below the predetermined threshold value despite the detected movement.

In certain embodiments of the method, initiating an engine restart request includes monitoring movement of surrounding vehicles, traffic light status changes, or stop sign proximity while the internal combustion engine is in the auto-stop state; detecting that the host movement score exceeds the predetermined threshold value; and sending a restart request to an auto-stop controller before detecting brake pedal release by a driver.

In certain embodiments of the method, preventing engine shut-off includes detecting approach to a traffic control device requiring a stop; determining based on the host movement score that a predicted stop duration is below a minimum threshold; and sending an inhibit request to an auto-stop controller to prevent engine shut-off.

In certain embodiments, the method further includes receiving driver customization settings for auto-stop behavior; and adjusting the predetermined threshold value or weighting factors used in calculating the host movement score based on the driver customization settings; wherein the driver customization settings include at least a selection between a tight following mode and a relaxed following mode for adaptive cruise control operation during auto-stop conditions.

In certain embodiments of the method, the one or more sensors include a front-facing camera; a radar sensor; a LIDAR sensor; or a combination thereof; and the method further includes receiving auto-stop state information from an engine management system.

In certain embodiments, the method further includes monitoring motion of vehicles in adjacent lanes to the host vehicle; adjusting the host movement score based on the motion of vehicles in adjacent lanes to an adjusted host movement score; and using the adjusted host movement score to estimate whether a stop will be longer or shorter than a predetermined duration.

In certain embodiments of the method, the controlling includes maintaining the internal combustion engine in an off state, and the method further includes detecting that adaptive cruise control is engaged and following a closest-in-path vehicle in stop-and-go traffic; detecting that both the host vehicle and the closest-in-path vehicle have come to a complete stop; detecting that an auto-stop system has shut off the internal combustion engine; detecting movement of the closest-in-path vehicle; and maintaining the host vehicle stationary with the internal combustion engine off when the movement of the closest-in-path vehicle is below a calibratable tolerance threshold, wherein the calibratable tolerance threshold is determined based on a velocity of the closest-in-path vehicle or a distance traveled by the closest-in-path vehicle since stopping.

In certain embodiments of the method, the calibratable tolerance threshold is adjustable through driver-selectable settings between a tight mode that closely follows closest-in-path vehicle movements; and a relaxed mode that ignores movements of the closest-in-path vehicle below a predetermined distance or velocity threshold while maintaining auto-stop.

In certain embodiments of the method, the controlling includes initiating an engine restart request, and the method further includes detecting that the host vehicle is in manual driving mode with the internal combustion engine in the auto-stop state; monitoring for movement of a lead vehicle from a stopped position, a traffic light changing from red to green, or vehicles in adjacent lanes beginning to move; calculating the host movement score based on the monitoring; and when the host movement score exceeds the predetermined threshold value, automatically requesting engine restart before detecting any brake pedal movement, thereby eliminating dead time between brake pedal release and torque availability.

In certain embodiments of the method, the controlling includes preventing engine shut-off, and the method further includes detecting that the host vehicle is approaching a stop in manual driving mode; identifying a type of stop based on perception data, including proximity to a stop sign, proximity to a yield sign, a right turn on red scenario at a traffic light, or a temporary stop for pedestrian crossing; determining that the type of stop indicates a brief stop with predicted duration below a calibratable time threshold; and sending an auto-stop inhibit request to prevent engine shut-off during the brief stop.

In another embodiment, a system for controlling auto-stop operation in a vehicle is provided and includes one or more sensors configured to at least facilitate monitoring motion parameters of one or more vehicles in a travel path of a host vehicle, traffic control device information, or planned maneuver information; a processor communicatively coupled to the one or more sensors and configured to calculate a host movement score based on a weighted combination of monitored information from the one or more sensors, wherein the host movement score represents a likelihood of imminent movement of the host vehicle within a predetermined time period; compare the host movement score to a predetermined threshold value to define a comparison; and generate control signals for an auto-stop system based on the comparison; and an auto-stop controller configured to receive the control signals and control an internal combustion engine, wherein the control includes maintaining the internal combustion engine in an off state when an adaptive cruise control system is active and the host movement score is below the predetermined threshold value, despite detected movement of a lead vehicle; initiating an engine restart while the internal combustion engine is in an auto-stop state and prior to brake pedal release when the host movement score exceeds the predetermined threshold value; or preventing engine shut-off when the host vehicle is approaching a stop and the host movement score exceeds the predetermined threshold value, indicating a predicted stop duration below a minimum time threshold.

In certain embodiments of the system, the processor includes a host movement assessor module configured to calculate the host movement score using probability values for closest-in-path vehicles, traffic control devices, and planned maneuvers; a longitudinal planner module configured to determine vehicle trajectory and speed commands; and a human-machine interface module configured to receive and process driver customization settings for auto-stop behavior.

In certain embodiments of the system, the one or more sensors include at least a front-facing camera and a radar sensor; the processor is further configured to receive auto-stop state information from an engine management system; and the system further includes an ADAS controller housing the processor and configured to output at least propulsion torque requests, deceleration requests, auto-stop resume requests, and auto-stop inhibit requests.

In certain embodiments, the system further includes a memory storing calibratable parameters including weighting factors for calculating the host movement score and threshold values for different driving scenarios; wherein the processor is configured to access different sets of calibratable parameters based on whether adaptive cruise control is engaged or the vehicle is in manual driving mode; and adjust tolerance for lead vehicle movements based on driver-selected customization between tight following and relaxed following modes.

In another embodiment, a vehicle is provided and includes an internal combustion engine with an auto-stop system; a perception system including one or more sensors configured to at least facilitate detecting surrounding vehicles, traffic control devices, and road infrastructure; an adaptive cruise control system; a processor configured to receive data from the perception system, calculate a host movement score indicating likelihood of required vehicle movement based on the data, compare the host movement score to a threshold to define a comparison, and generate control commands based on the comparison; and an auto-stop controller configured to at least facilitate controlling the internal combustion engine based on the control commands, including extending engine-off duration during adaptive cruise control operation by tolerating minor movements of lead vehicles when the host movement score is below the threshold, preemptively restarting the internal combustion engine based on surrounding vehicle movements when the host movement score exceeds the threshold, and inhibiting engine shut-off for predicted brief stops when the host movement score indicates imminent movement.

DESCRIPTION OF THE DRAWINGS

The present disclosure will hereinafter be described in conjunction with the following drawing figures, wherein like numerals denote like elements, and wherein.

DETAILED DESCRIPTION

Figure 1:
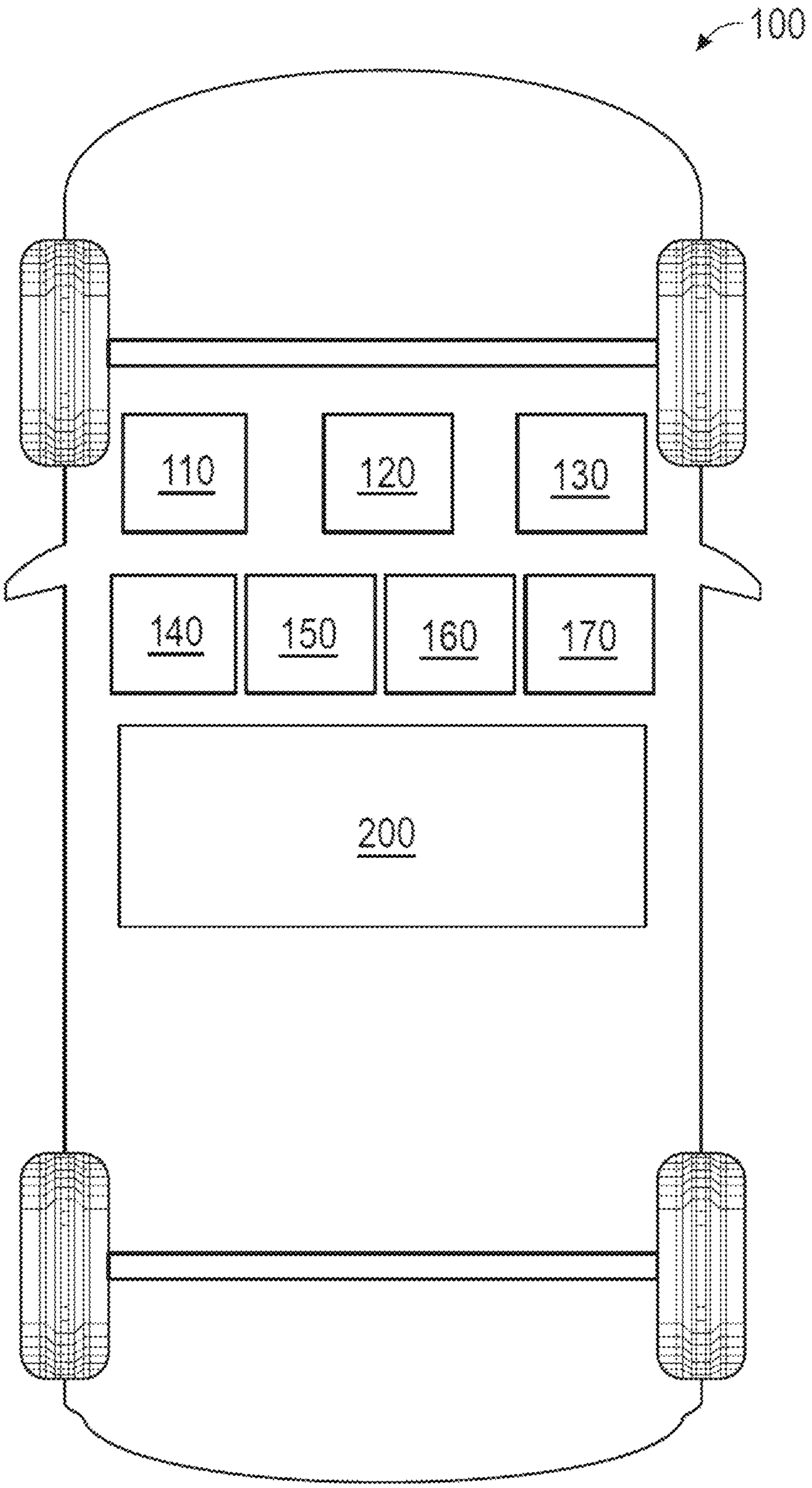
FIG. 1 is a functional block diagram of a vehicle that includes a control system for integrating adaptive cruise control and engine auto-stop functionality, in accordance with exemplary embodiments.

The following detailed description is merely exemplary in nature and is not intended to limit the disclosure or the application and uses thereof. Furthermore, there is no intention to be bound by any theory presented in the preceding background or the following detailed description.

As used herein, the term module refers to any hardware, software, firmware, electronic control unit or component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of automated driving systems including cruise control systems, automated driver assistance systems and autonomous driving systems, and that the vehicle system described herein is merely one example embodiment of the present disclosure.

Finally, for the sake of brevity, conventional techniques and components related to vehicle mechanical parts and other functional aspects of the system (and the individual operating components of the system) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment. It should also be understood that the figures are merely illustrative and may not be drawn to scale.

Additionally, the following description refers to elements or features being "connected" or "coupled" together. As used herein, "connected" may refer to one element/feature being directly joined to (or directly communicating with) another element/feature, and not necessarily mechanically. Likewise, "coupled" may refer to one element/feature being directly or indirectly joined to (or directly or indirectly communicating with) another element/feature, and not necessarily mechanically. However, it should be understood that, although two elements may be described below, in one embodiment, as being "connected," in alternative embodiments similar elements may be "coupled," and vice versa. Thus, although the schematic diagrams shown herein depict example arrangements of elements, additional intervening elements, devices, features, or components may be present in an actual embodiment.

For purposes of the present description, unless specifically disclaimed, use of the singular includes the plural and vice versa, the terms "and" and "or" shall be both conjunctive and disjunctive, and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof. As used herein, a component that is "configured to" perform a specified function is capable of performing the specified function without alteration, rather than merely having potential to perform the specified function after further modification. In other words, the described hardware, when expressly configured to perform the specified function, is specifically selected, created, implemented, utilized, programmed, and/or designed for the purpose of performing the specified function.

Embodiments herein provide a control system and method for intelligently integrating adaptive cruise control (ACC) and engine auto-stop functionality in vehicles. In certain embodiments, the system employs a host movement assessor that calculates a host movement score based on perception data from surrounding vehicles, traffic control devices, and planned maneuvers. This score indicates the likelihood or necessity of imminent host vehicle movement and is used to optimize engine auto-stop operation across different driving scenarios.

In certain embodiments, the system operates in three primary modes. One mode addresses ACC operation in stop-and-go traffic, where the system tolerates small movements of lead vehicles while maintaining the engine in an off state, thereby extending engine auto-stop duration and improving fuel efficiency. Rather than immediately restarting the engine when a lead vehicle moves slightly forward, the system evaluates whether the movement truly necessitates host vehicle motion.

Another mode operates during manual driving when the engine is in an engine auto-stop state. In certain embodiments, the system monitors surrounding conditions such as lead vehicle movement, traffic light changes, or adjacent lane activity, and preemptively initiates engine restart before the driver releases the brake pedal. This eliminates the dead time typically experienced between brake release and torque availability, addressing a common source of driver dissatisfaction with engine auto-stop systems.

Another mode prevents unnecessary engine auto-stop activation during brief stops. In certain embodiments, the system uses perception data to identify temporary stop conditions such as stop signs, yield signs, or right turns at red lights, and inhibits engine shut-off when the predicted stop duration falls below a threshold. This prevents the annoyance of engine cycling during momentary stops and encourages continued use of the engine auto-stop feature.

Each mode may be independently enabled and configured through driver-selectable settings, allowing customization between fuel efficiency optimization and driving responsiveness preferences. The system thereby addresses key limitations of current engine auto-stop implementations while maximizing environmental benefits.

Embodiments of the present disclosure offer advantages over the existing art, though it is understood that other embodiments may offer different advantages, not all advantages are necessarily discussed herein, and no particular advantage is required for all embodiments.

FIG. 1 illustrates a vehicle 100, according to an exemplary embodiment. As described in greater detail further below, the vehicle 100 includes a control system 200 for integrating adaptive cruise control and engine auto-stop functionality to improve fuel efficiency and reduce emissions while maintaining vehicle responsiveness, in accordance with exemplary embodiments.

In various embodiments, the vehicle 100 comprises an automobile, such as a sedan, wagon, truck, or sport utility vehicle (SUV). In certain embodiments, the vehicle 100 may comprise other types of vehicles. The vehicle 100 may be a conventional vehicle, hybrid vehicle, or electric vehicle with engine auto-stop capability.

In various embodiments, the vehicle 100 includes adaptive cruise control functionality and engine auto-stop functionality. The adaptive cruise control system 130 maintains a set speed while following a lead vehicle at a predetermined distance. The engine auto-stop system 120 automatically shuts off an engine 110 when the vehicle 100 comes to a stop to reduce fuel consumption and emissions.

In the depicted embodiment, the vehicle 100 includes a body that houses various components. The vehicle 100 also includes a plurality of wheels for movement. A drive system 150 drives the wheels and includes the engine 110. The engine 110 may be an internal combustion engine equipped with the engine auto-stop system 120.

The vehicle 100 further includes a braking system 160 and a steering system 170. In exemplary embodiments, the braking system 160 and steering system 170 are controlled via driver inputs and/or automatically via the control system 200.

Figure 3:
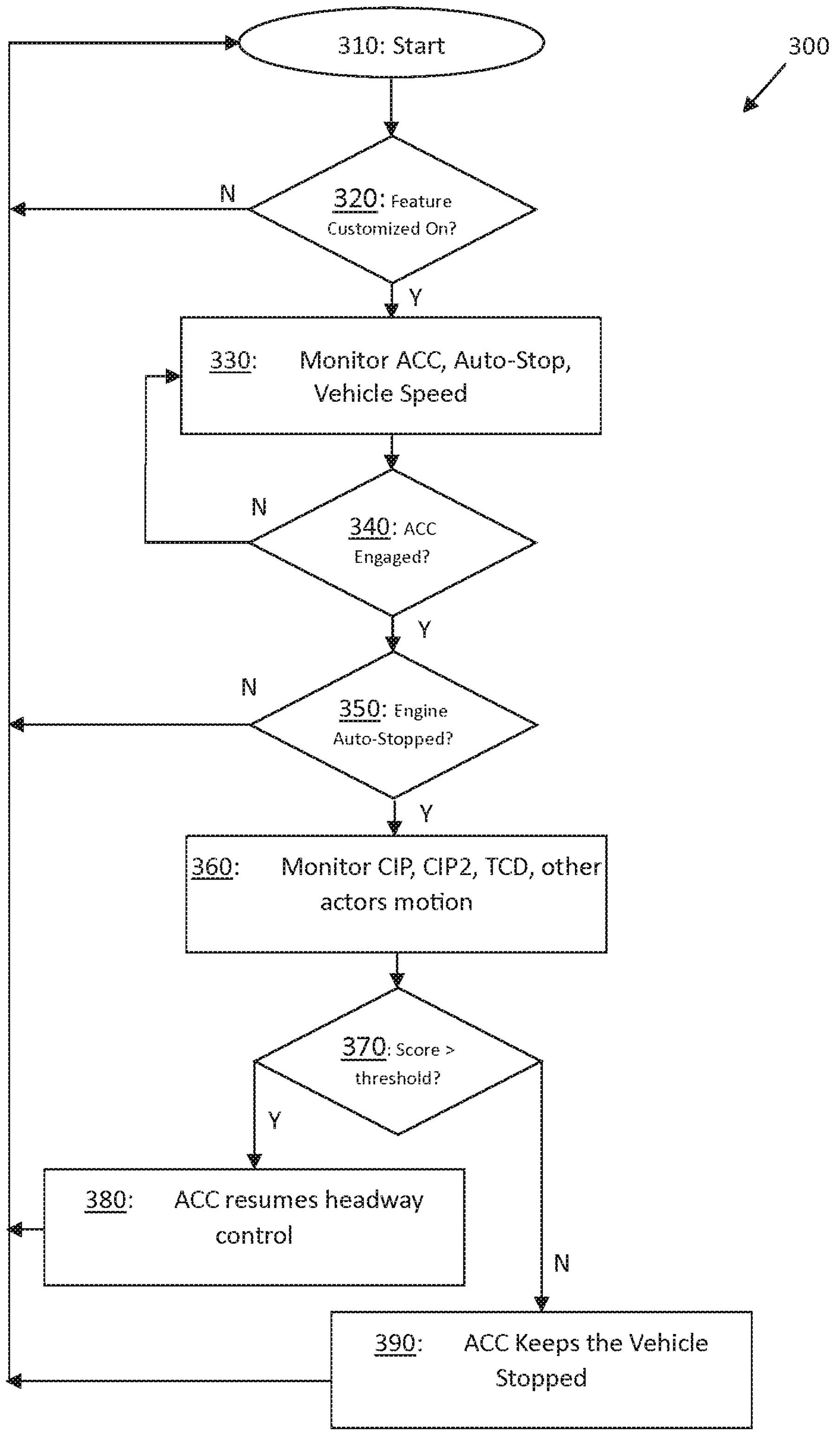
FIG. 3 is a flowchart of a method for controlling engine auto-stop operation during adaptive cruise control engagement in stop-and-go traffic, in accordance with exemplary embodiments.
Figure 4:
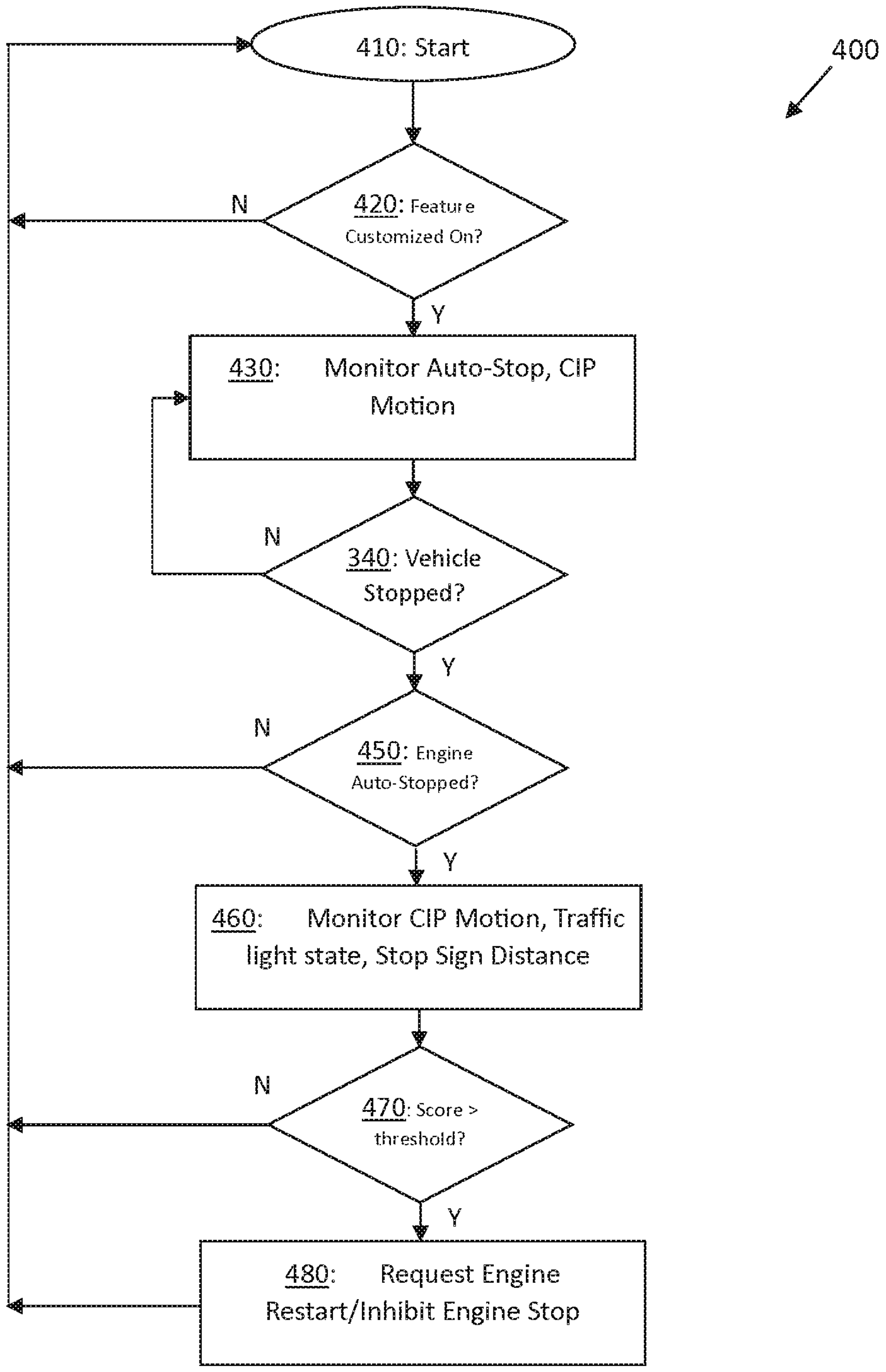
FIG. 4 is a flowchart of a method for preemptively restarting an engine during manual driving with engine auto-stop active, in accordance with exemplary embodiments.
Figure 5:
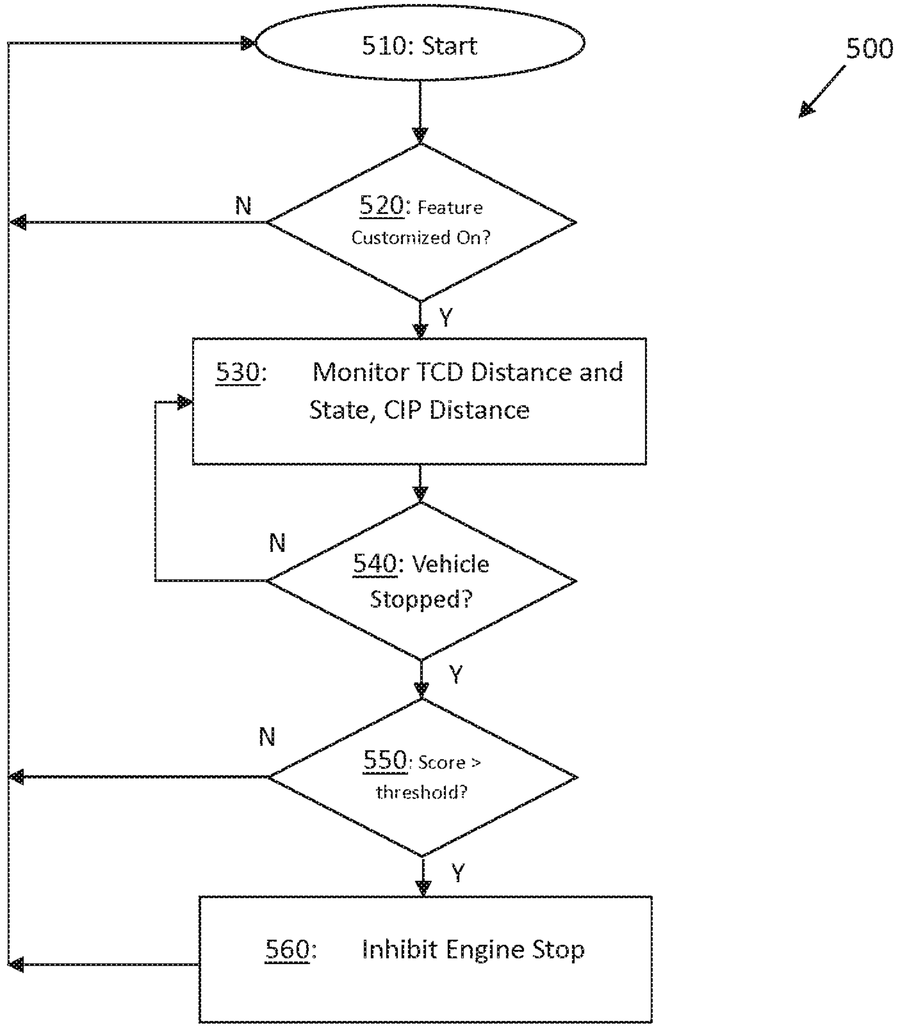
FIG. 5 is a flowchart of a method for inhibiting engine auto-stop during brief stops, in accordance with exemplary embodiments.

In the embodiment depicted in FIG. 1, the control system 200 is coupled to the engine auto-stop system 120, the adaptive cruise control system 130, the drive system 150, the braking system 160, and the steering system 170. The control system 200 integrates operation of the adaptive cruise control and engine auto-stop functionalities to optimize fuel efficiency while maintaining appropriate vehicle response. In various embodiments, this is accomplished in accordance with methods 300, 400, and 500 as depicted in FIGS. 3-5 and described further below.

As depicted in FIG. 1, in various embodiments, the control system 200 includes sensors 140 and a processor. The sensors 140 may include a front camera, radar sensors, lidar sensors, and other perception sensors for detecting surrounding vehicles, traffic control devices, and road conditions.

Figure 2:
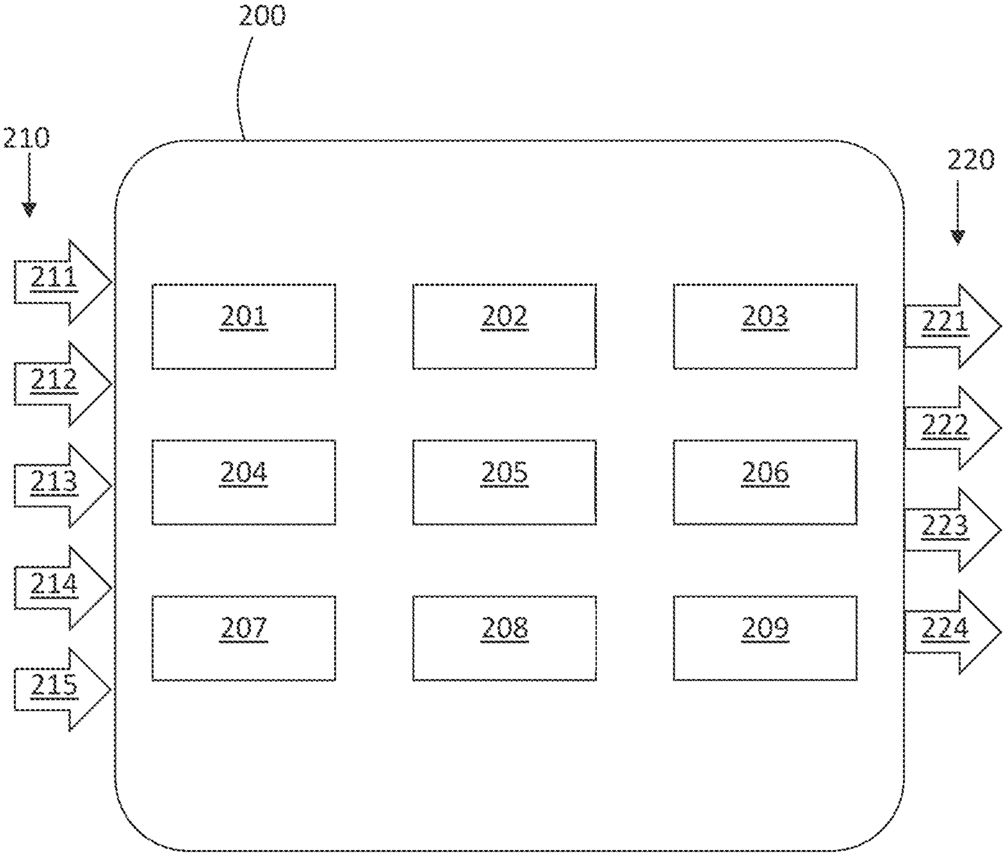
FIG. 2 is a functional block diagram of the control system of FIG. 1, showing inputs, internal modules, and outputs, in accordance with exemplary embodiments.

FIG. 2 is a functional block diagram of the control system 200. In various embodiments, the control system 200 receives various inputs 210 including front camera input 211, radar/lidar information input 212, traffic control devices information input 213, engine auto-stop state input 214, and driver input 215 (such as ACC control inputs).

Within the control system 200, several modules process the input data. The feature state management module 201 manages the operational states of various features. The object perception module 202 processes sensor data to identify and track surrounding objects. The Human-Machine Interface (HMI)/customization module 203 handles human-machine interface functions and driver customization settings. In certain embodiments, the HMI/customization module 203 is modified to allow driver selection between different following behaviors during engine auto-stop conditions.

The longitudinal planner module 204 determines the vehicle's longitudinal trajectory and speed profile. In certain embodiments, the longitudinal planner 204 is modified to incorporate host movement assessor outputs. The trajectory generation module 205 creates specific trajectory commands, and the longitudinal controller 206 executes these commands.

A host movement assessor module 207 represents a new functionality in certain embodiments. The host movement assessor 207 calculates a host movement score that indicates the likelihood or necessity of host vehicle movement based on various inputs. The driver input monitoring module 208 tracks driver control inputs, and the override detection module 209 identifies when the driver wishes to override automatic control.

The control system 200 outputs various control signals 220 including propulsion torque requests 221, deceleration requests 222, ADAS auto-stop resume requests 223, and Advanced Driver Assistance System (ADAS) auto-stop inhibit requests 224. These outputs control the vehicle's propulsion, braking, and engine auto-stop functionality.

Within the control system 200, several modules process the input data. The feature state management module 260 manages the operational states of various features. The object perception module 270 processes sensor data to identify and track surrounding objects. The HMI/customization module 280 handles human-machine interface functions and driver customization settings. In certain embodiments, the HMI/customization module 280 is modified to allow driver selection between different following behaviors during engine auto-stop conditions.

The longitudinal planner module 290 determines the vehicle's longitudinal trajectory and speed profile. In certain embodiments, the longitudinal planner 290 is modified to incorporate host movement assessor outputs. The trajectory generation module 295 creates specific trajectory commands, and the longitudinal controller 297 executes these commands.

A host movement assessor module 207 represents a new functionality in certain embodiments. The host movement assessor 207 calculates a host movement score that indicates the likelihood or necessity of host vehicle movement based on various inputs. The driver input monitoring module 208 tracks driver control inputs, and the override detection module 209 identifies when the driver wishes to override automatic control.

The control system 200 outputs various control signals including propulsion torque requests 221, deceleration requests 222, ADAS auto-stop resume requests 223, and ADAS auto-stop inhibit requests 224. These outputs control the vehicle's propulsion, braking, and engine auto-stop functionality.

FIG. 3 is a flowchart of a method 300 for controlling engine auto-stop operation during adaptive cruise control engagement, in accordance with exemplary embodiments. The method 300 may be implemented by the control system 200 and processor thereof.

The method 300 begins at Start 310. At inquiry 320, the system determines whether the feature is customized to be ON. If not, the method returns to Start 310. If yes, the method proceeds to step 330 where the system monitors ACC state, engine auto-stop state, and vehicle speed.

At inquiry 340, the system determines whether ACC is engaged. If no, method 300 continues at step 330 with continuing to monitor ACC state, engine auto-stop state, and vehicle speed. If yes, the method 300 proceeds to inquiry 350 to determine whether the engine is auto-stopped.

If inquiry 350 determines that the engine is auto-stopped, the method proceeds to step 360 to monitor closest-in-path vehicles (with "CIP" referring to the closest-in-path vehicle immediately in front of the vehicle 100, and "CIP2" referring to the second closest-in-path vehicle, i.e., the vehicle in front of the CIP vehicle), traffic control devices ("TCD"), and other actor motion.

At inquiry 370, the system determines whether the host movement score exceeds a threshold. If yes, the ACC resumes headway control at step 380. If no, the ACC keeps the vehicle stopped at step 390, maintaining the engine in the off state despite potential small movements of the lead vehicle.

FIG. 4 is a flowchart of a method 400 for preemptively restarting the engine during manual driving with engine auto-stop active. The method 400 begins at step 410 and proceeds through similar initial checks at inquiries 420 and 430.

At inquiry 440, if the engine is auto-stopped, the method proceeds to step 450 to monitor CIP motion, traffic light status changes, and stop sign proximity. At inquiry 460, if the host movement score exceeds the threshold, the system requests engine restart at step 470 even before the driver releases the brake pedal, thereby eliminating dead time in torque delivery.

FIG. 5 is a flowchart of a method 500 for inhibiting engine auto-stop during brief stops. After initial checks at inquiries 510 and 520, the method monitors traffic control device distance and state at step 530. At inquiry 540, if the vehicle is approaching a stop and inquiry 550 determines the host movement score exceeds the threshold (indicating a brief stop), the system inhibits engine stop at step 560.

In certain embodiments, the host movement score is calculated as a function of probabilities related to lead vehicles, surrounding actors, traffic control devices, and planned maneuvers:

$$\text{Host movement score}=f(p_{cip},p_{cip2},p_{tcd},p_{mnvr})$$

In an exemplary embodiment, this may be implemented as a weighted sum:

$$f=w_{cip}\times p_{cip}+w_{cip2}\times p_{cip2}+w_{tcd}\times p_{tcd}+w_{mnvr}\times p_{mnvr}$$

The probability for the closest-in-path vehicle (CIP) and the second closest-in-path vehicle (CIP2) may be calculated as:

$$p_{CIP}=a_1\times vCIP+b_1\times\int_0^t v_{CIP}dt \quad t=0 \text{ when first stopped}$$

$$p_{CIP2}=a_2\times vCIP_2+b_2\times\int_0^t v_{CIP2}dt \quad t=0 \text{ when first stopped}$$

where vCIP is the velocity of the closest-in-path vehicle, and the integral represents distance traveled since the host stopped, and $vCIP_2$ is the velocity of the second closest-in-path vehicle, and the integral represents distance traveled since the host stopped.

The probability for traffic control devices may be determined based on traffic light status and proximity to stop signs. For example, $p_{tcd}$ may equal 1 for a green light with no CIP, a calibratable value c for a green light with CIP, 1 when distance to a stop sign is less than $d_0$, and 0 otherwise.

Parameters $a_1$, $b_1$, calibratable value c, and weighting factors $w_i$ are calibratable to adjust system behavior. In certain embodiments, only inputs with high integrity (Automotive Safety Integrity Level or ASIL-rated) are factored into the calculations.

Figure 6:
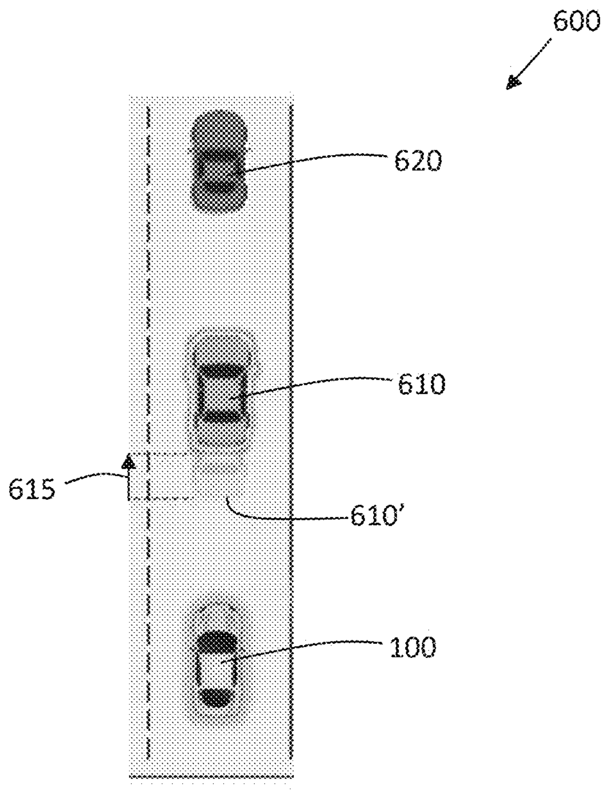
FIGS. 6-8 are scenario diagrams illustrating the operation of the system in various conditions, in accordance with exemplary embodiments.

FIG. 6 illustrates an example scenario 600 in stop-and-go traffic when ACC is active. In FIG. 6, the host vehicle 100 is stopped behind a stopped closest-in-path vehicle (CIP) 610, which is behind a stopped second closest-in-path vehicle (CIP2) 620.

In current implementations, when vehicles 100, 610, and 620 stop, and engine auto-stop in vehicle 100 activates, then small movements of the CIP vehicle 610 may cause the ACC to restart the engine of vehicle 100 in order to close the gap with the CIP vehicle 610, thereby losing engine auto-stop benefits. With the disclosed system, small movements of the CIP vehicle 610 are tolerated based on the host movement score, allowing the engine of vehicle 100 to remain off for longer periods.

For example, CIP vehicle 610 may be stopped at an initial location 610' when vehicle 100 stops and engine auto-stop activates. Then, CIP vehicle 610 may move forward by distance 615 before stopping again. In embodiments herein, when distance 615 is less than a threshold value, the ACC is prevented from restarting the engine of vehicle 100 to close the gap.

Figure 7:
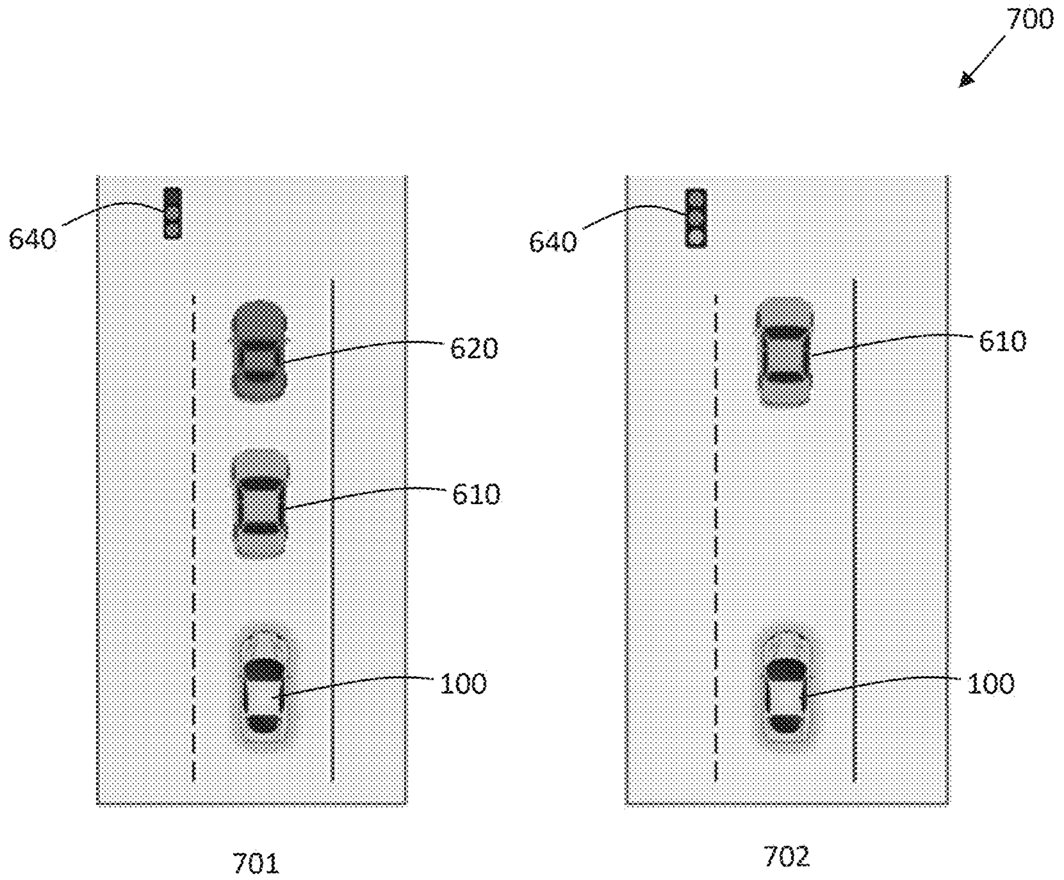

FIG. 7 illustrates an example scenario 700 for resuming driving after engine auto-stop is activated. In the scenario 700, ACC is not active and the vehicle 100 is manually driven by a driver. In FIG. 7, the host vehicle 100 is stopped behind a stopped closest-in-path vehicle (CIP) 610, which is behind a stopped second closest-in-path vehicle (CIP2) 620, at a traffic control device 640 in the form of a traffic light.

In the initial condition 701, the traffic light is red and the engine auto-stop is activated.

In the subsequent condition 702, the traffic light has turned green, second closest-in-path vehicle (CIP2) 620 has driven away, and closest-in-path vehicle (CIP) 610 is moving toward the traffic light.

In certain embodiments herein, the system and method recognize that in subsequent condition 702, a desire to move vehicle 100 is imminent, and the system is prepared to restart the engine before the driver disengages the brake. Thus, the vehicle 100 is ready to move without delay when the driver disengages the brake.

In certain embodiments herein, the system and method recognize that in subsequent condition 702, a desire to move vehicle 100 is imminent, and are prepared to restart the engine based on brake pedal position before the driver totally disengages the brake. Thus, the vehicle 100 is ready to move without delay when the driver disengages the brake.

Figure 8:
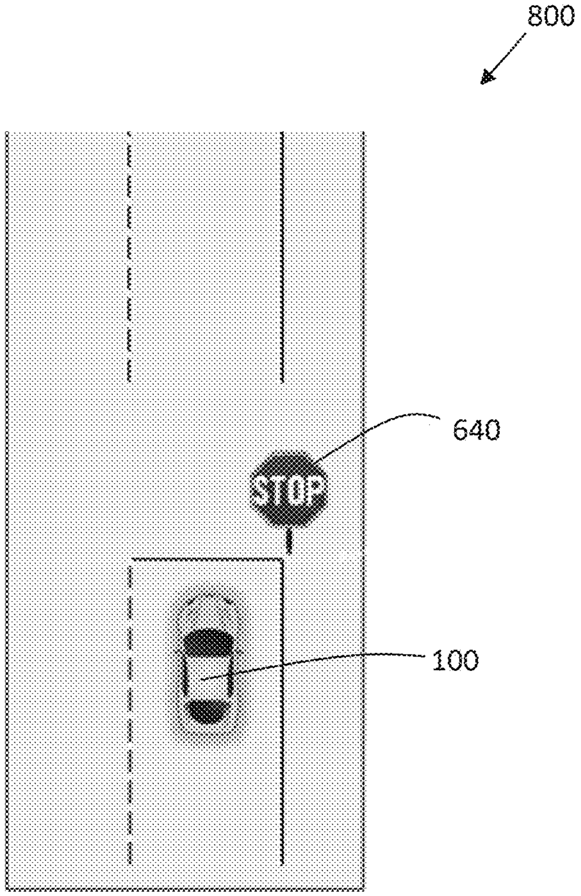

FIG. 8 illustrates an example scenario 800 in which a vehicle stop is brief and engine auto-stop is avoided. In the scenario 800, ACC is not active and the vehicle 100 is manually driven by a driver. In FIG. 8, the host vehicle 100 approaches and stops at a traffic control device 640 in the form of a stop sign. No other vehicles, pedestrians, or others are present at the roadway near the stop sign.

In certain embodiments herein, the system and method recognize that the vehicle stop at the stop sign will be brief, and that engine auto-stop may be inhibited in anticipation of the imminent movement of the vehicle 100 after stopping for the stop sign. Thus, the vehicle 100 is ready to move without delay when the driver disengages the brake.

Similarly, when approaching an intersection with a red light but planning to turn right (based on turn signals and navigation), the host movement assessor may generate a higher score recognizing the intention to move soon, preventing unnecessary engine auto-stop activation.

In various embodiments, the system provides driver customization options. Drivers may select between "tight" performance that closely follows CIP movements or "relaxed" performance that ignores relatively small CIP movements. In certain embodiments, drivers may have tight following during normal operation but relaxed following during engine auto-stop to maximize fuel efficiency.

The traffic control and maneuver classification considers various factors. Traffic control device factors may include localization to traffic lights, traffic light status, localization to turn signs and stop signs, proximity to temporary traffic signs and cones. Planned maneuver factors may include turn signal status, steering angle, proximity to navigation route turns, proximity to lane endings, and proximity to pedestrian crossings.

The system operation varies based on driving mode and conditions. During ACC operation in stop-and-go traffic, the system maintains engine-off state for longer periods by tolerating small lead vehicle movements. While manual driving with engine auto-stop active, the system monitors surrounding conditions and preemptively restarts the engine based on environmental cues to eliminate restart delay. When approaching brief stops, the system prevents unnecessary engine shutdowns.

In certain embodiments, the calibratable parameters allow tuning for different markets, vehicle types, or customer preferences. The tolerance for lead vehicle movement may be adjusted from 1 meter to 10 meters or more, depending on desired behavior. The time thresholds for brief stops may be adjusted based on typical stop sign behavior in different regions.

The integration with existing vehicle systems may be accomplished through standard automotive communication protocols. The ADAS controller communicates with the engine management system to send engine auto-stop resume and inhibit requests. The system may operate with various sensor configurations, though higher-quality sensors enable more robust operation.

It will be appreciated that the systems, vehicles, and methods may vary from those depicted in the Figures and described herein. For example, the vehicle 100 and control system 200 may include additional or fewer components in different embodiments. The methods 300, 400, and 500 may include additional steps or execute steps in different orders while achieving similar results.

While at least one exemplary embodiment has been presented in the foregoing detailed description, it should be appreciated that variations exist. The exemplary embodiments are only examples and are not intended to limit the scope, applicability, or configuration of the disclosure. Rather, the foregoing detailed description provides a convenient road map for implementing exemplary embodiments. Various changes can be made in the function and arrangement of elements without departing from the scope of the disclosure as set forth in the appended claims and legal equivalents thereof.

What is claimed is:

1. A method for controlling auto-stop operation in a vehicle, comprising:

monitoring, via one or more sensors, motion parameters of one or more vehicles in a travel path of a host vehicle, traffic control device information, or planned maneuver information;

calculating, by a processor, a host movement score based on a weighted combination of monitored information from the one or more sensors, wherein the host movement score represents a likelihood of imminent movement of the host vehicle within a predetermined time period;

comparing, by the processor, the host movement score to a predetermined threshold value to define a comparison; and controlling, by the processor, an auto-stop system of the host vehicle based on the comparison, wherein controlling includes:

maintaining an internal combustion engine in an off state when an adaptive cruise control system is active and the host movement score is below the predetermined threshold value, despite detected movement of a lead vehicle ahead of the host vehicle;

initiating an engine restart request while the internal combustion engine is in an auto-stop state and prior to release of a brake pedal when the host movement score exceeds the predetermined threshold value, indicating an anticipated movement; or preventing engine shut-off when the host vehicle is approaching a stop and the host movement score exceeds the predetermined threshold value, indicating a predicted stop duration below a minimum time threshold.

2. The method of claim 1, wherein calculating the host movement score comprises:

calculating a weighted sum according to the formula:

$$\text{Host movement score} = w_{cip} \times p_{cip} + w_{cip2} \times p_{cip2} + w_{tcd} \times p_{tcd} + w_{mnvr} \times p_{mnvr}$$

where $w_{cip}$, $w_{cip2}$, $w_{tcd}$, and $w_{mnvr}$ are weighting factors, and $p_{cip}$, $p_{cip2}$, $p_{tcd}$, and $p_{mnvr}$ are probability values for a closest-in-path vehicle, a second closest-in-path vehicle, traffic control devices, and planned maneuvers, respectively.

3. The method of claim 2, wherein calculating $p_{cip}$ comprises:

$$\text{determining } p_{cip} = a1 \times \text{vCIP} + b1 \times \int \text{vCIP}\, dt$$

where vCIP is a velocity of the closest-in-path vehicle, a1 and b1 are calibration parameters, and the integral is calculated from a time when the host vehicle first stopped.

4. The method of claim 2, wherein calculating $p_{tcd}$ comprises:

assigning $p_{tcd}=1$ when a traffic light is green and no closest-in-path vehicle is present;

assigning $p_{tcd}=c$ when the traffic light is green and a closest-in-path vehicle is present, where c is a value between 0 and 1;

assigning $p_{tcd}=1$ when a distance to a stop sign is less than a threshold distance d0; and assigning $p_{tcd}=0$ otherwise.

5. The method of claim 1, wherein the planned maneuver information comprises:

turn signal status of the host vehicle;

steering angle of the host vehicle;

proximity to a turn in a planned route;

proximity to a lane ending; or proximity to pedestrian crossings.

6. The method of claim 1, wherein maintaining the internal combustion engine in an off state comprises:

detecting that adaptive cruise control is engaged;

detecting that the internal combustion engine is in the auto-stop state;

detecting movement of a closest-in-path vehicle; and maintaining the host vehicle in a stopped position when the host movement score remains below the predetermined threshold value despite the detected movement.

7. The method of claim 1, wherein initiating an engine restart request comprises:

monitoring movement of surrounding vehicles, traffic light status changes, or stop sign proximity while the internal combustion engine is in the auto-stop state;

detecting that the host movement score exceeds the predetermined threshold value; and sending a restart request to an auto-stop controller before detecting brake pedal release by a driver.

8. The method of claim 1, wherein preventing engine shut-off comprises:

detecting approach to a traffic control device requiring a stop;

determining based on the host movement score that a predicted stop duration is below a minimum threshold; and sending an inhibit request to an auto-stop controller to prevent engine shut-off.

9. The method of claim 1, further comprising:

receiving driver customization settings for auto-stop behavior; and adjusting the predetermined threshold value or weighting factors used in calculating the host movement score based on the driver customization settings;

wherein the driver customization settings include at least a selection between a tight following mode and a relaxed following mode for adaptive cruise control operation during auto-stop conditions.

10. The method of claim 1, wherein the one or more sensors comprise a front-facing camera; a radar sensor; a LIDAR sensor; or a combination thereof; and wherein the method further comprises receiving auto-stop state information from an engine management system.

11. The method of claim 1, further comprising:

monitoring motion of vehicles in adjacent lanes to the host vehicle;

adjusting the host movement score based on the motion of vehicles in adjacent lanes to an adjusted host movement score; and using the adjusted host movement score to estimate whether a stop will be longer or shorter than a predetermined duration.

12. The method of claim 1, wherein the controlling comprises maintaining the internal combustion engine in an off state, the method further comprising:

detecting that adaptive cruise control is engaged and following a closest-in-path vehicle in stop-and-go traffic;

detecting that both the host vehicle and the closest-in-path vehicle have come to a complete stop;

detecting that an auto-stop system has shut off the internal combustion engine;

detecting movement of the closest-in-path vehicle; and maintaining the host vehicle stationary with the internal combustion engine off when the movement of the closest-in-path vehicle is below a calibratable tolerance threshold, wherein the calibratable tolerance threshold is determined based on a velocity of the closest-in-path vehicle or a distance traveled by the closest-in-path vehicle since stopping.

13. The method of claim 12, wherein the calibratable tolerance threshold is adjustable through driver-selectable settings between:

a tight mode that closely follows closest-in-path vehicle movements; and a relaxed mode that ignores movements of the closest-in-path vehicle below a predetermined distance or velocity threshold while maintaining auto-stop.

14. The method of claim 1, wherein the controlling comprises initiating an engine restart request, the method further comprising:

detecting that the host vehicle is in manual driving mode with the internal combustion engine in the auto-stop state;

monitoring for:

movement of a lead vehicle from a stopped position, a traffic light changing from red to green, or vehicles in adjacent lanes beginning to move;

calculating the host movement score based on the monitoring; and when the host movement score exceeds the predetermined threshold value, automatically requesting engine restart before detecting any brake pedal movement, thereby eliminating dead time between brake pedal release and torque availability.

15. The method of claim 1, wherein the controlling comprises preventing engine shut-off, the method further comprising:

detecting that the host vehicle is approaching a stop in manual driving mode;

identifying a type of stop based on perception data, including:

proximity to a stop sign, proximity to a yield sign, a right turn on red scenario at a traffic light, or a temporary stop for pedestrian crossing;

determining that the type of stop indicates a brief stop with predicted duration below a calibratable time threshold; and sending an auto-stop inhibit request to prevent engine shut-off during the brief stop.

16. A system for controlling auto-stop operation in a vehicle, comprising:

one or more sensors configured to at least facilitate monitoring motion parameters of one or more vehicles in a travel path of a host vehicle, traffic control device information, or planned maneuver information;

a processor communicatively coupled to the one or more sensors and configured to:

calculate a host movement score based on a weighted combination of monitored information from the one or more sensors, wherein the host movement score represents a likelihood of imminent movement of the host vehicle within a predetermined time period;

compare the host movement score to a predetermined threshold value to define a comparison; and generate control signals for an auto-stop system based on the comparison; and an auto-stop controller configured to receive the control signals and control an internal combustion engine, wherein the control comprises:

maintaining the internal combustion engine in an off state when an adaptive cruise control system is active and the host movement score is below the predetermined threshold value, despite detected movement of a lead vehicle;

initiating an engine restart while the internal combustion engine is in an auto-stop state and prior to brake pedal release when the host movement score exceeds the predetermined threshold value; or preventing engine shut-off when the host vehicle is approaching a stop and the host movement score exceeds the predetermined threshold value, indicating a predicted stop duration below a minimum time threshold.

17. The system of claim 16, wherein the processor comprises:

a host movement assessor module configured to calculate the host movement score using probability values for closest-in-path vehicles, traffic control devices, and planned maneuvers;

a longitudinal planner module configured to determine vehicle trajectory and speed commands; and a human-machine interface module configured to receive and process driver customization settings for auto-stop behavior.

18. The system of claim 16, wherein:

the one or more sensors comprise at least a front-facing camera and a radar sensor;

the processor is further configured to receive auto-stop state information from an engine management system; and the system further comprises an ADAS controller housing the processor and configured to output at least:

propulsion torque requests, deceleration requests, auto-stop resume requests, and auto-stop inhibit requests.

19. The system of claim 16, further comprising:

a memory storing calibratable parameters including weighting factors for calculating the host movement score and threshold values for different driving scenarios;

wherein the processor is configured to:

access different sets of calibratable parameters based on whether adaptive cruise control is engaged or the vehicle is in manual driving mode; and adjust tolerance for lead vehicle movements based on driver-selected customization between tight following and relaxed following modes.

20. A vehicle comprising:

an internal combustion engine with an auto-stop system;

a perception system including one or more sensors configured to at least facilitate detecting surrounding vehicles, traffic control devices, and road infrastructure;

an adaptive cruise control system;

a processor configured to:

receive data from the perception system, calculate a host movement score indicating likelihood of required vehicle movement based on the data, compare the host movement score to a threshold to define a comparison, and generate control commands based on the comparison; and an auto-stop controller configured to at least facilitate controlling the internal combustion engine based on the control commands, including:

extending engine-off duration during adaptive cruise control operation by tolerating minor movements of lead vehicles when the host movement score is below the threshold, preemptively restarting the internal combustion engine based on surrounding vehicle movements when the host movement score exceeds the threshold, and inhibiting engine shut-off for predicted brief stops when the host movement score indicates imminent movement.

* * * * *